United States Patent [19]

Ausubel

[11] Patent Number: 6,026,383
[45] Date of Patent: Feb. 15, 2000

[54] SYSTEM AND METHOD FOR AN EFFICIENT DYNAMIC AUCTION FOR MULTIPLE OBJECTS

[76] Inventor: Lawrence M. Ausubel, 2920 Garfield Ter., NW. Washington, D.C. 20008

[21] Appl. No.: 08/582,901

[22] Filed: Jan. 4, 1996

[51] Int. Cl.[7] .................................................. G06F 157/00
[52] U.S. Cl. ............................................................ 705/37
[58] Field of Search ........................ 364/479.06; 705/10, 705/26, 35, 37; 707/104, 5, 10

[56] References Cited

U.S. PATENT DOCUMENTS

| | | | |
|---|---|---|---|
| 5,235,680 | 8/1993 | Bijnagte | 395/161 |
| 5,283,731 | 2/1994 | Lalonde et al. | 364/401 |

FOREIGN PATENT DOCUMENTS

WO 96/34356  10/1996  WIPO ............................. G06F 17/60

OTHER PUBLICATIONS

J. S. Banks, J. O. Ledyard and D. P. Porter, "Allocating Uncertain and Unresponsive Resources: An Experimental Approach", *Rand Journal of Economics*, vol. 20, No. 1, Spring 1989, pp. 1–25.

G. Demange, D. Gale and M. Sotomayer, "Multi–Item Auctions", *Journal of Political Economy*, vol. 94, No. 4, 1986, pp. 863–872.

F. Gül and E. Stacchetti, "English Auctions with Multiple Goods", *Princeton University and The University of Michigan, Mimeo*, Oct. 12, 1995, pp. 1–20.

R. P. McAfee and J. McMillan, "Auctions and Bidding", *Journal of Economic Literature*, vol. 25, Jun. 1987, pp. 699–738.

K. A. McCabe, S. J. Rassenti and V. L. Smith, "Testing Vickrey's and Other Simultaneous Multiple Unit Versions of the English Auction," *Research in Experimental Economics*, vol. 4, Greenwich, CT: JAI Press, 1991, pp. 45–79.

F. M. Menezes, *Four Essays on Auction Theory*, University of Illinois doctoral dissertation, Feb. 1993, pp. 1–97 and 143–152.

P. R. Milgrom and R. J. Weber, "A Theory of Auctions and Competitive Bidding," *Econometrica*, vol. 50, No. 5Sep. 1982, pp. 1089–1122.

M. H. Rothkopf, T. J. Teisberg and E. P. Kahn, "Why Are Vickrey Auctions Rare?"*Journal of Political Economy*, vol. 98, No. 1, 1990, pp. 94–109.

U.S. Department of the Treasury, U.S. Securities and Exchange Commission, and Board of Governors of the Federal Reserve System, *Joint Report on the Government Securities Market*, Washington, D.C. : U.S.G.P.O., Jan. 1992, pp. ix–xvi, 1–34, B–17–B–24.

W. Vickrey, "Counterspeculation, Auctions, and Competitive Sealed Tenders," *Journal of Finance*, vol. 16, 1961, pp. 8–37.

W. Vickrey, "Auctions and Bidding Games", *Recent Advances in Game Theory*, Princeton: Princeton University Conference, 1962, pp. 15–29.

W. Vickrey, "Auctions, Markets, and Optimal Allocation", *Bidding and Auctioning for Procurement and Allocation*, New York: New York University Press 1976, pp. 13–20.

(List continued on next page.)

*Primary Examiner*—Frantzy Poinvil
*Attorney, Agent, or Firm*—Morgan & Finnegan L.L.P.

[57] ABSTRACT

An automated system for conducting an auction and a method for operating the system. The system comprises a plurality of bid entry terminal and a bidding information processor communicatively coupled to the bid entry terminals. Bidders at the bid entry terminals observe displayed information and enter bids accordingly. The bidding information processor and the bid entry terminals communicate and process information in order to conduct an auction. The method involves conducting an auction in which the price paid by bidders is independent of their own bids, in which participants are provided with information concerning their competitors' bids as the auction progresses, and in which the confidentiality of high values is maintained.

25 Claims, 7 Drawing Sheets

OTHER PUBLICATIONS

R. J. Weber, "Multiple–Object Auctions", *Auctions, Bidding, and Contracting: Uses and Theory,* New York: New York University Press, 1983, pp. 165–191.

R. Wilson, "Auction of Shares", *Quarterly Journal of Economics,* vol. 94, 1979, pp. 675–689.

F. M. Menezes, "Four Essays on Auction Theory", University of Illinois Doctoral Dissertation, pp. 1–97 and 143–152, Feb. 1993.

"Joint Report on the Government Securities Market", U.S. Department of theTreasury, pp. ix–xvi, 1–34, and B–17–B24, Jan. 1992.

R.J. Weber, "Multiple–Object Auctions", Auctions, Bidding, and Contracting: Uses and Theory, New York University Press, pp. 165–191, 1983.

W. Vickrey, "Counterspeculating, Auctions, and Competitive Sealed Tenders", Journal of Finance, v 16, pp. 8–37, 1961.

6,026,383

SYSTEM AND METHOD FOR AN EFFICIENT DYNAMIC AUCTION FOR MULTIPLE OBJECTS

BACKGROUND OF THE INVENTION

1. Field of the Invention

The invention relates to the conduct of an automated auction, and in particular to automated conduct of an efficient dynamic auction for multiple objects.

2. Background Information

A number of auction formats are well known in the art. For example, there are several variations on the sealed-bid format, in which each bidder simultaneously and independently submits a sealed bid to the auctioneer. The sealed-bid format has at least two major disadvantages. One disadvantage of the sealed-bid format is that auction participants are not provided the opportunity to respond to their competitors' bids—in a sealed-bid auction, the earliest that any bidder gets to observe the other submitted bids is at the conclusion of the auction. Bidders thus are unable to infer information about the common-value component of valuation (that is, the component of value which is common to all the bidders) contained in their competitors' bids, and are unable to react to the common- value information in their subsequent bidding.

A second disadvantage of the sealed-bid format is that the auction process effectively reveals the valuation of the highest bidder to the auctioneer. Suppose that a broadcast license were to be sold by a second-price, sealed-bid auction (often known as the Vickrey auction, after Vickrey (1961), who proposed an auction in which the auctioned object is awarded to the highest bidder, but he is only charged the second-highest price). Say that Bidder A, who valued the license the most, placed a value of $200 million on the license, while Bidder B, the second-highest-valuation buyer, placed a value of only $50 million on the license. If the auction process were fully trustworthy, and if bids were kept fully confidential, Bidder A would like to submit a sealed bid of $200 million, and Bidder B would like to bid $50 million. However, bidders may fear the following scenario. The seller, knowing after the bidding that Bidder A actually values the license at $200 million, may attempt to renege on the sale, and renegotiate the price above the $50 million established by the second- price auction. Alternatively, the seller, after receiving the $200 million sealed bid, may surreptitiously plant a bogus $199 million bid (or enlist a "shill" to insert a bid in his own name). Finally, if the seller is the Government, the seller may fear the public-relations disaster when it becomes generally known that it is selling a public asset which Bidder A values at $200 million for a price which is a mere quarter of that value.

Another example of an auction format well known in the art is the standard open ascending-bid format, in which each bidder is allowed to place a bid greater than the previous bid on any object, and is aware of all prior bids and by whom they were placed. This format has the disadvantage that the price paid by a bidder for the objects that he wins depends on the bidder's own bids. Consider any bidder who demands a significant proportion of the objects being auctioned. The bidder has an incentive to engage in "demand reduction" and to "shade" his bids relative to what the objects are worth to him. This may result in an inefficient allocation of the objects being auctioned, as well as a reduction in the seller's auction revenues.

The best-known examples of sealed-bid auctions in the art include: the U.S. Treasury's "discriminatory" auctions of bonds and bills; the U.S. Treasury's "uniform-price" auctions of bonds and bills; and the Vickrey auction, proposed by Vickrey (1961). Each of these auctions is a sealed-bid format, and so suffers from the disadvantages described above: the absence of any possibility for bidders to react to their competitors' bids; and the revelation of the high-bidder's value to the auctioneer. In addition, the Treasury auctions share the same disadvantage as the standard open ascending- bid auction, that substantial bidders have the incentive to engage in demand reduction and bid shading. Meanwhile, the Vickrey auction has the additional disadvantage of being perceived as complicated and unintuitive to bidders.

The best-known examples of standard open ascending-bid auctions in the art include: the open-outcry auctions of Sotheby's and Christie's; and the Federal Communications Commission's auctions of airwaves. Each of these auction formats has the disadvantage that the price levels paid by a bidder are influenced by the bidder's own bids, so that as described above, a substantial bidder has the incentive to engage in demand reduction and bid shading, reducing allocative efficiency and expected revenues.

The main economic efficiency objectives in the design of an auction are twofold: to maximize the allocative efficiency of the auction outcome; and to maximize the seller's expected revenues. These objectives are believed to be best accomplished by adhering to three fundamental guidelines. First, an auction should be structured so that the price paid by a winning bidder is as independent as possible of that bidder's own bids. This provides each participant with full incentive to truthfully bid his value for the objects in the auction, without any shading of bids. Second, an auction should be structured so as to maximize the information which is available to each bidder at the time that bids are placed. This is believed to cause bidders to bid more aggressively than in a sealed-bid format, since bidders recognize the common-value component reflected in their competitors' bids. Third, an auction should be structured so as to avoid, as much as possible, the need for the highest bidder to reveal his true value. This prevents the seller, and other buyers, from later using this information against him, thus giving high bidders the confidence to bid up to their true values.

Ideally, an auction format would adhere to all three fundamental guidelines of the previous paragraph. However, in the context of auctions of multiple objects, no such format has previously been disclosed. The standard open ascending-bid auction does not satisfy the first fundamental guideline; while the sealed-bid auction does not satisfy either the second or the third fundamental guidelines.

SUMMARY OF THE INVENTION

The present invention is a system and method for conducting an auction in which the price paid by bidders is independent of their own bids, in which participants are provided with information concerning their competitors' bids as the auction progresses, and in which the confidentiality of high values is maintained. This provides the advantage of improving the economic efficiency of the auction design over the existing art.

The present invention comprises a plurality of bid entry terminal (BET) and a bidding information processor (BIP) communicatively coupled to the bid entry terminals. Bidders at the bid entry terminals observe displayed information and enter bids accordingly. The bidding information processor and the bid entry terminals communicate and process information in order to conduct an auction.

An auction in accordance with the present invention proceeds as follows: First, the auctioneer determines a starting price and announces it to the bidders. Each bidder responds with a bid indicating how many objects each wishes to purchase at the current price. Typically, the total number of objects desired by all the bidders is greater than the number of objects which are available. In this case, the auctioneer determines whether any of the objects should be assigned to any bidders in this round. This is done by determining for each bidder, sequentially, whether the sum of the bids of all the other bidders is less than the number of objects available. In other words, is there is at least one object which is desired by only one bidder? Those objects are then assigned to that bidder, obligating that bidder to purchase them at the price standing at that time. If any objects remain available, the auctioneer announces a new price and the auction continues.

Certain constraints are necessary in order for this auction to operate properly and to reach an economically efficient result. First, the informational assumption used in this example is that after every round of bidding, each bidder can observe the exact number of objects desired by every other bidder. The activity rule used in this example is that bidders are not allowed to increase their bids from round to round. Rather, each bidder is permitted to demand the same quantity as in the previous round of bidding or any lower quantity.

While an auction following these rules could be conducted manually, computerized conduct of the auction allows the auction to be conducted with all bidding information taken into account, while controlling the degree to which the information itself is disclosed to the participants. Computerized conduct of the auction also allows the auction to be conducted swiftly, even if bidders are not located on-site. The amount of information which is transmitted to the BETs and/or actually displayed to the bidders may be carefully controlled. In one embodiment, all bidding information is displayed to the bidders. In another embodiment, no bidding information is displayed to the bidders; only the results of the auction are displayed. A number of intermediate embodiments are also possible, in which some, but not all bidding information is displayed to the bidders.

The present invention is useful for conducting auctions involving objects offered for sale by the bidders, as well as objects offered for sale to the bidders. Although the terms "quantity demanded" (by a bidder) and "demand curve" (of a bidder) are used to describe the present invention, the terms "quantity offered" (by a bidder) and "supply curve" (of a bidder) are equally applicable. In some cases, this is made explicit by the use of both terms, or by the use of the terms "quantity to transact" (by a bidder) and "transaction curve" (of a bidder). The term "quantity to transact" includes both "quantity demanded" and "quantity offered". The term "bid" includes both offers to sell and offers to buy. The term "transaction curve" includes both "demand curve" and "supply curve".

In one embodiment, the present invention is a computerized method of conducting an auction of one or more identical objects, similar objects or close substitutes. The method involves accepting a "sealed bid" consisting of a demand or supply curve or a set of contingent demand or supply curves, with the advantage that the auctioneer only gets to observe the portion of the bidder's demand or supply curve which is needed to decide the outcome (i.e., each bidder's ultimate quantity and payment) of the auction. The unused portion of the demand or supply curve (e.g., the portion above the market-clearing price, and for contingencies which are not reached) never gets transmitted to the auctioneer, and it may be erased from the memory of the Terminal at the close of the auction. Thus, the confidentiality of the unused part of the demand or supply curve is preserved. The bidder enters his demand or supply curve into the bid entry terminal before the start of the auction. The bid entry terminal then transmits the quantity demanded or offered at each price, as requested by the bidding information processor and without manual intervention by the bidder, during the course of the auction.

In another embodiment, the present invention is a computerized method of conducting an auction of one or more identical objects, similar objects or close substitutes. The method involves accepting the quantity demanded or offered at each price requested by the bidding information processor and transmitting the quantities demanded to the bidding information processor. The bidder receives auction information from the bid entry terminal and enters his demands or offers interactively into the bid entry terminal as the auction progresses.

In still another embodiment, the present invention is a computerized method of conducting an auction, involving accepting, at bid entry terminals, a price offered or asked by each bidder for specified objects and transmitting indicators of these prices and objects to the bidding information processor. The bidder receives auction information from the bid entry terminal and enters his demands interactively into the bid entry terminal as the auction progresses.

The present invention may be used for auctioning items including, but not restricted to, the following: Treasury and corporate bonds, bills, stocks, and other securities and derivatives; communications licenses and spectrum rights; electric power and other commodity items; airport landing slots; and emission allowances and pollution permits. While many applications involve the selling of multiple objects, the present invention can equally be used for the buying or procurement of multiple objects.

BRIEF DESCRIPTION OF THE DRAWINGS

FIG. 2b is a flow diagram of a subprocess of step 212 of FIG. 2a.

DETAILED DESCRIPTION OF THE INVENTION

Figure 1A:
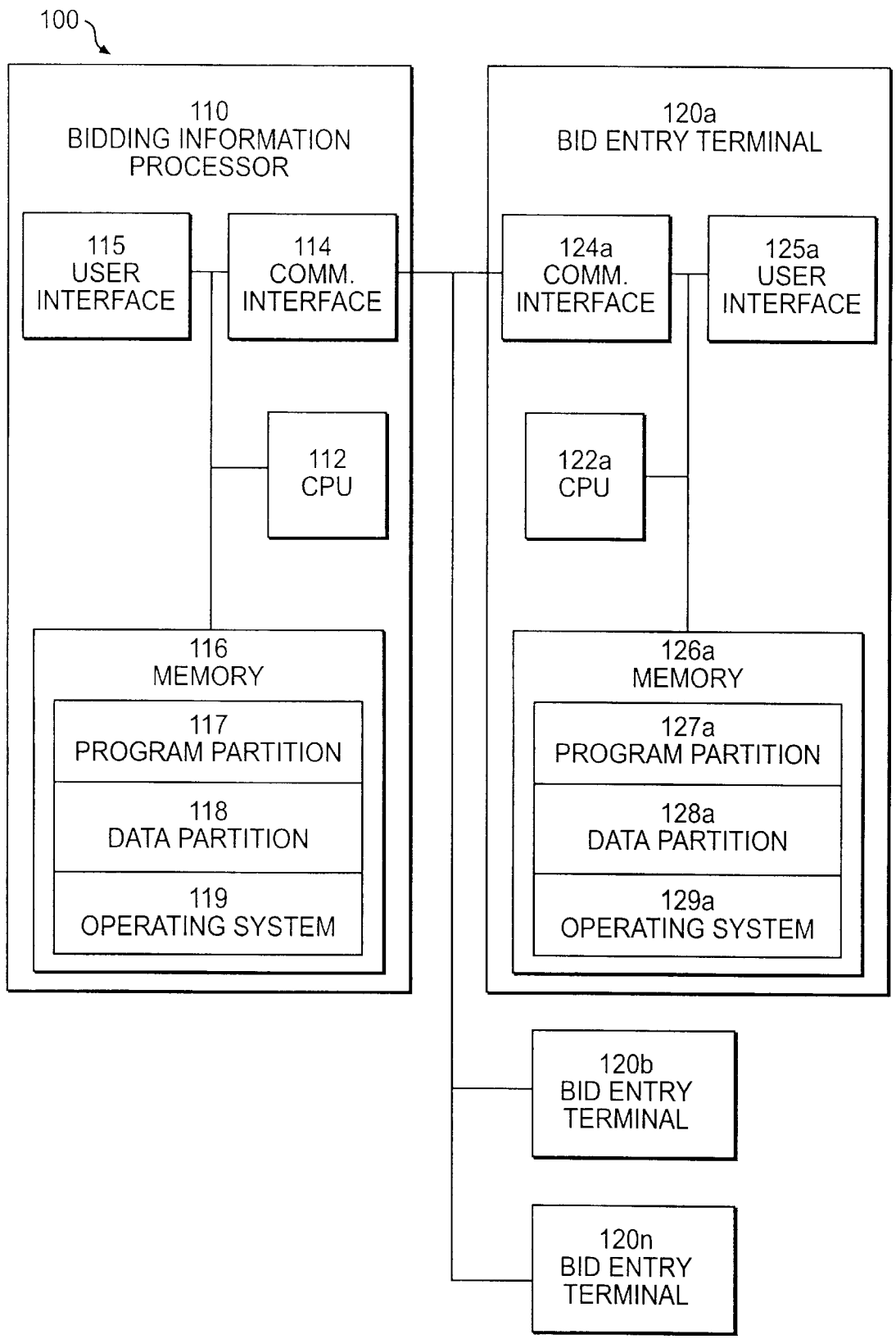
FIG. 1a is an exemplary block diagram of auction system 100 comprising one embodiment of the present invention.

FIG. 1a is an exemplary block diagram of auction system 100, which is one embodiment of the present invention. System 100 includes Bidding Information Processor (BIP) 110 and a plurality of Bid Entry Terminals (BET) 120a–n. The invention is implemented by the system of BIP 110 and a plurality of BETs each operating as will be described in the following portions of the specification. Each BET 120 is communicatively coupled to BIP 110 over communication system 130. A typical Bid Entry Terminal (BET) is represented by BET 120a. BET 120a includes CPU 122a which executes program instructions which carry out the sequence of steps of the present invention. BET 120a includes communication interface 124a, which transmits and receives signals over communication system 130 under control of CPU 122a. These signals represent messages generated by CPU 122a and messages destined for CPU 122a. BET 120a includes memory 126a, which stores program instructions and data used by CPU 122a. Memory 126a includes program partition 127a, which stores the program instructions executed by CPU 122a in performing the functions of the present invention, data partition 128a, which stores data used by CPU 122a in conjunction with the program instructions in program partition 127a, and operating system 129a. Memory 126a is constructed of random access memory devices and may include other storage devices such as, for example, hard disk storage devices, floppy disk storage devices, tape storage devices, optical disk storage devices and read-only memory devices, BET 120a also includes user interface 125a, which allows a bidder to enter and receive bidding information. User interface 125a typically includes, for example, a display and a keyboard, and may include a device such as a mouse.

BIP 110 includes CPU 112 which executes program instructions which carry out the sequence of steps of the present invention. BIP 110 includes communication interface 114, which transmits and receives signals over communication system 130 under control of CPU 112. These signals represent messages generated by CPU 112 and messages destined for CPU 112. BIP 110 includes memory 116, which stores program instructions and data used by CPU 112. Memory 116 includes program partition 117, which stores the program instructions executed by CPU 112 in performing the functions of the present invention, data partition 118, which stores data used by CPU 112 in conjunction with the program instructions in program partition 117, and operating system 119. Memory 116 is constructed of random access memory devices and may include other storage devices such as, for example, hard disk storage devices, floppy disk storage devices, tape storage devices, optical disk storage devices and read-only memory devices, BIP 110 may also include user interface 115, which allows a system operator to observe and control the operation of the present invention. User interface 115 typically includes, for example, a display and a keyboard, and may include a device such as a mouse.

In one embodiment, bid entry terminals 120a–n and bidding information processor 110 are personal computers or workstations. In this embodiment, communication system 130 is a local or wide area network, such as, for example, Ethernet, Token-Ring, a telephone system, the Internet, the World Wide Web or the Information Superhighway. In another embodiment, bid entry terminals 120a–n are "dumb" terminals and bidding information processor 110 is a central computer system, such as, for example, a multi-user personal computer, mini-computer or mainframe computer. Other system architectures are also envisioned, such as, for example, including one or more intermediary computers or devices which request and transmit data as needed. Alternatively, the BETs and BIP can be computer programs located on the same computer.

Figure 1B:
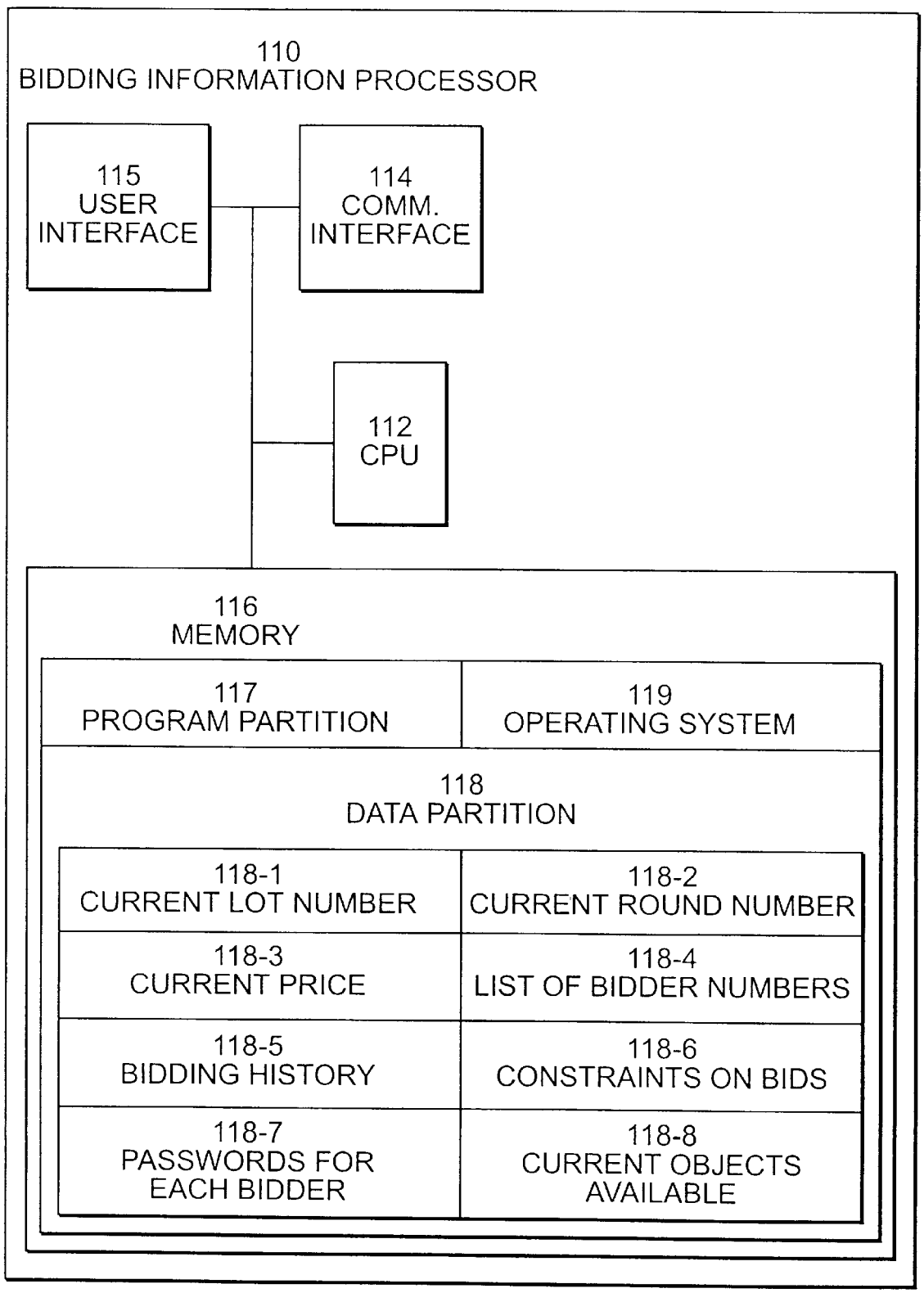
FIG. 1b is a block diagram of BIP 110 showing the contents of data partition 118 of FIG. 1a in greater detail.

FIG. 1b is a block diagram of BIP 110 showing the contents of data partition 118 in greater detail. Data partition 118 contains a plurality of memory locations which store data used to practice the present invention. Memory location 118-1 stores the current lot number, which identifies the group of objects being auctioned. Location 118-2 stores the current round number of the auction of the current lot of objects. Location 118-3 stores the current price for the current round. Location 118-4 stores a list of participating bidders and information identifying each bidder, such as, for example, a bidder number. Location 118-5 stores the bidding history prior to the current round. Location 118-6 stores constraints on the bid which each bidder may submit in the current round. Location 118-7 stores information relating to security features, such as, for example, passwords for each bidder or encryption keys.

Figure 2A:
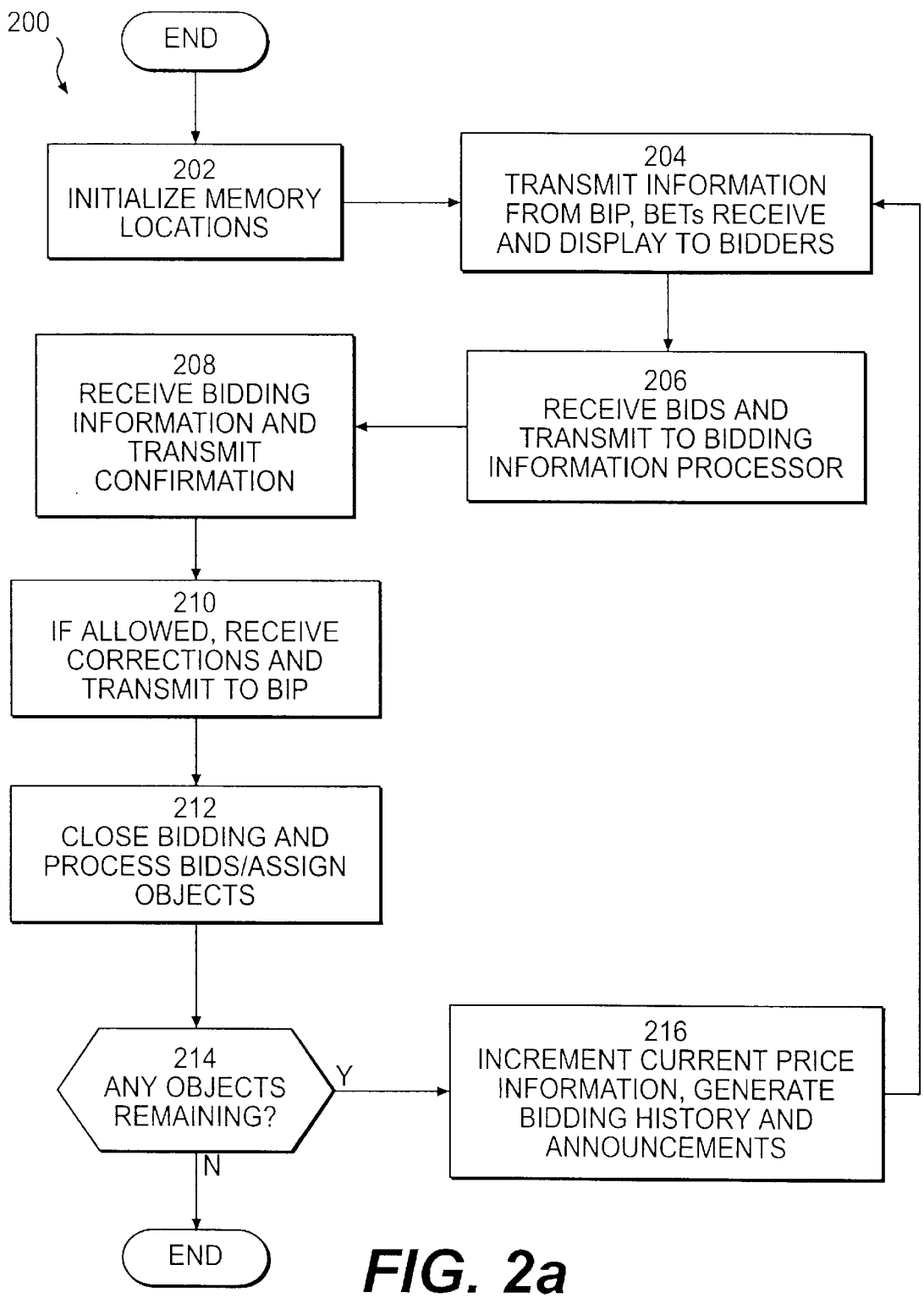
FIG. 2a is a flow diagram of a process 200 in accordance with one embodiment of the present invention.

FIG. 2a is a flow diagram of a process 200 in accordance with one embodiment of the present invention. Process 200 starts with step 202, in which memory locations in data partition 118 of memory 116 of BIP 110 are initialized. In step 202, the appropriate memory locations are initialized with information such as the number of objects available and the initial price for the auction. In step 204, information regarding the bidding process is transmitted from BIP 110 to BETs 120a–n. The BETs receive the information and display it to the bidders. The transmitted information may include the current lot number, the current round number, the current price for the current round, the bidder number of the bidder at each respective bid entry terminal, the bid history prior to the current round, auction announcements and messages for the current round, constraints on the bid which the bidder may submit in the current round and passwords or other security information.

The bid history is information relating to the bids submitted by bidders in prior rounds. For example, this may or may not include each of the following:

1. The disaggregated quantities demanded by each bidder in prior rounds, where each bidder is identified by name. This allows each bidder to know each bid made during the auction and who made each bid.
2. The disaggregated quantities demanded by each bidder in prior rounds, where each bidder is identified only by a confidential bidder identification number. This allows each bidder to know each bid made during the auction and to track the bids of individual bidders, but prevents each bidder's actual identity from being known.
3. The aggregate quantity demanded by all bidders in prior rounds.
4. The number of objects remaining to be sold.
5. The bidder's own obligations which have been determined thus far.

The auction announcements and messages include other information which is provided to bidders. For example, this may or may not include each of the following:

1. Whether the auction is still open, or whether it has concluded;
2. The deadline by which the next bid must be submitted by bid entry terminals;
3. The schedule for upcoming rounds of the auction;
4. Information concerning the required substance of bids, for example whether the quantity each bidder demands is required to be no greater than the quantity the same bidder demanded in the previous round;
5. Other ad hoc announcements or messages which the bidding information processor would like to convey to bid entry terminals.

In step 206, the bid entry terminals receive bids from the participating bidders and transmit them to the bidding information processor. The transmitted information may include the current lot number, the current round number, the current price for the current round, the bidder number of the bidder at each respective bid entry terminal, the quantity which the bidder demands in the current round and any passwords or other security information. In step 208, the bidding information processor receives the information transmitted from the bid entry terminals and sends a confirmation message which may include the current lot number, the current round number, the bidder number of the bidder, confirmation of the bid and passwords or other security information. In step 210, if the auction rules allow, the bid entry terminals may receive corrections to the bids or withdrawals of bids from the bidders and transmit these corrections or withdrawals to the bidding information processor. In addition to the corrections or withdrawals, the current lot number, the current round number, the bidder number and any passwords or security information is also transmitted.

In step 212, the bidding information processor closes the bidding for the current round and processes the bids received from each of the bid entry terminals. This process is shown in more detail in FIG. 2b. In step 214, the BIP determines whether any available objects remain. If so, the process goes to step 216 in which the BIP increments the current price information and generates the bidding history and any auction announcements and messages. The process then loops to step 204. If no available objects remain, the process ends.

Figure 2B:
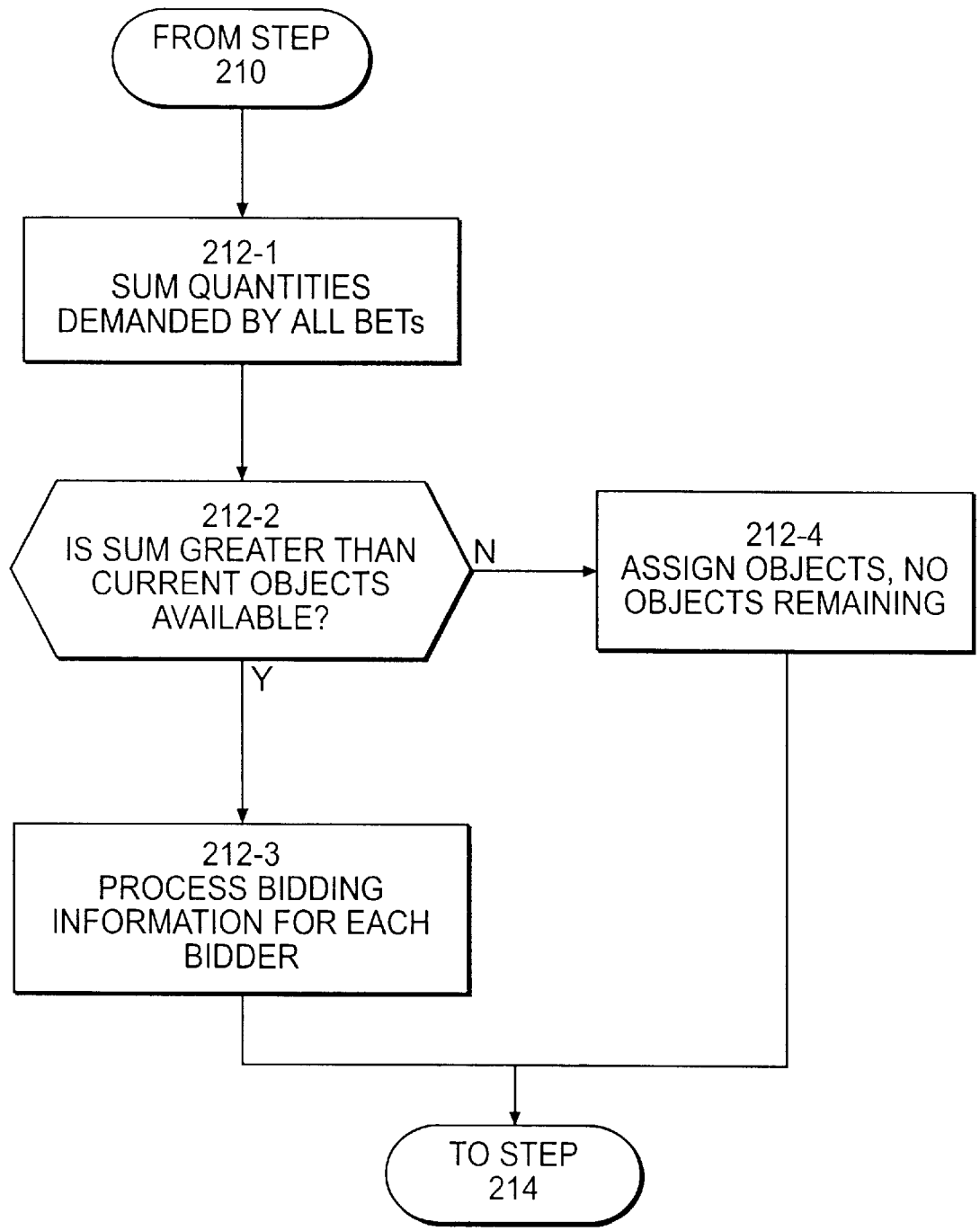

FIG. 2b is a flow diagram of a subprocess of step 212. It begins with step 212-1, in which the bidding information processor sums the associated quantities demanded by all the bid entry terminals. In step 212-2, the bidding information processor determines whether the sum is more than the current number of available objects. If the sum is not more than the current number of available objects, the bidding information processor proceeds to the step 212-4. If the sum is more than the current number of available objects, the process continues with step 212-3, in which the bidding information processor considers each bidder in turn and assigns objects to any winning bidders. This step is shown in more detail in FIG. 2c. In step 212-4, if the sum of the quantities demanded by all bidders exactly equals the current number of available objects, then each bidder is assigned the demanded quantity at the current price, and the auction ends. If the sum of the quantities demanded by all bidders is less than the current number of available objects, then each bidder is assigned the demanded quantity at the current price, and the residual quantity is assigned to bidders according to their demands in the previous period, for example by a proportionate assignment rule, and the auction ends.

Figure 2C:
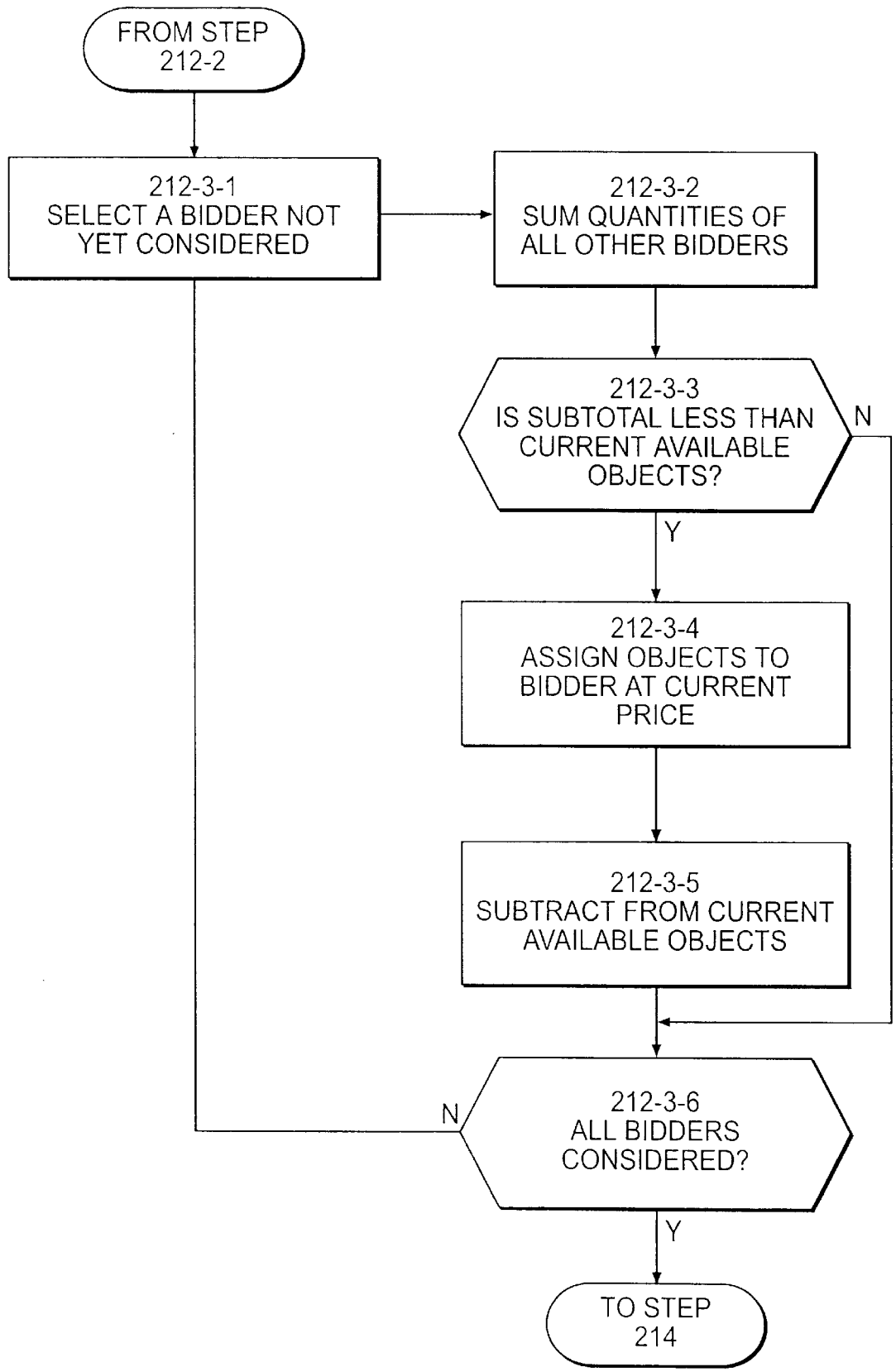
FIG. 2c is a flow diagram of a subprocess of step 212-3 of FIG. 2b.

FIG. 2c is a flow diagram of a subprocess of step 212-3. It begins with step 212-3-1, in which a bidder which has not yet been considered is selected. In step 212-3-2, for the bidder currently being considered, the bidding information processor sums the associated quantities demanded by all of the bidders other than the current bidder. In step 212-3-3, the bidding information processor compares the subtotal to the current number of available objects. If the subtotal is greater than or equal to the total number of available objects, no items are credited to the current bidder. If the subtotal is less than the total number of available objects, then process continues with step 212-3-4, in which the bidding information processor assigns the difference to the current bidder at the current price. In step 212-3-5, the number of units assigned is subtracted from the total number of objects considered to be available, as well as from the quantity demanded by the current bidder. In step 212-3-6, it is determined whether all bidders have been considered. If not, the process then loops back to step 212-3-1. If all bidders have been considered, the process goes to step 214 of FIG. 2a.

Figure 3:
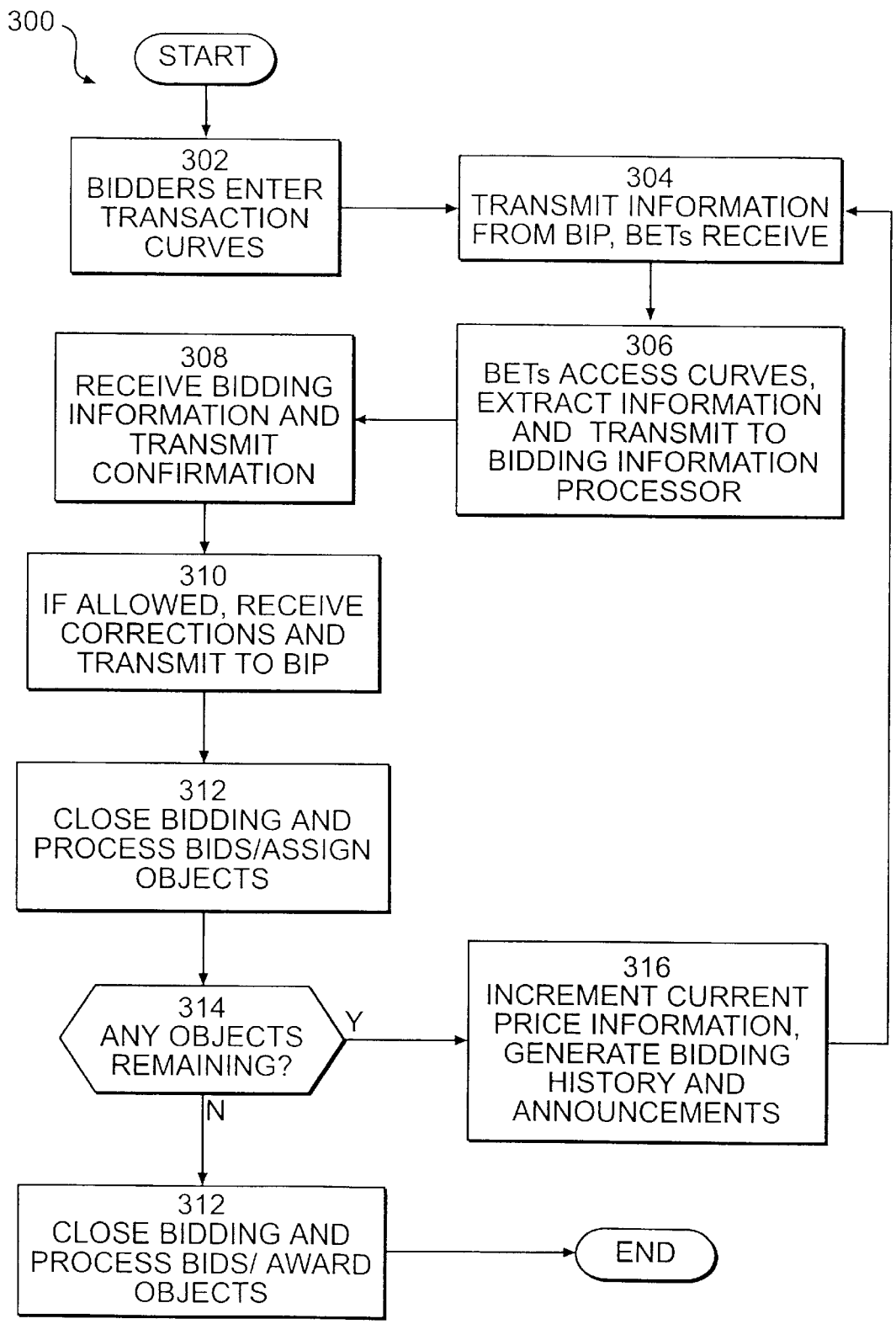
FIG. 3 is a flow diagram of process 300 in accordance with another embodiment of the present invention.

FIG. 3 is a flow diagram of process 300 in accordance with another embodiment of the present invention. Process 300 begins with step 302, in which each participating bidder enters his demand curve into his respective bid entry terminal. A demand curve is a table of the quantity which a bidder desires at each possible price that may be named in the course of the auction. One aspect of this embodiment is that each bidder may also be allowed to enter contingent demand curves. Contingent demand curves allow a bidder to vary his demand curve based on the bidding history received from the bidding information processor. For example, the quantity which a bidder demands at a particular price may depend on the quantity which another bidder demanded at a previous price.

Each demand curve or contingent demand curve entered is constrained to be non-increasing. That is, the quantity demanded at a higher price is restricted to be no more than the quantity demanded at any lower price, on any demand curve or contingent demand curve entered.

In step 304, information regarding the bidding process is transmitted from BIP 110 to BETs 120*a–n*. The information transmitted to the BETs and/or displayed to the bidders may be easily controlled, and may be optimized for the particular circumstances. In one embodiment, no information is displayed to the bidders. In other embodiments, some information is displayed, allowing the bidders to see information needed to modify their responses after the auction has begun. The transmitted information may include the current lot number, the current round number, the current price for the current round, the bidder number of the bidder at each respective bid entry terminal, the bid history prior to the current round, auction announcements and messages for the current round, constraints on the bid which the bidder may submit in the current round and passwords or other security information.

In step 306, the bid entry terminals access the entered demand curves based on the current price and the contingent demand curves based on the bidding history and extract the corresponding bidding information. The BETs then transmit the information to the bidding information processor. The transmitted information may include the current lot number, the current round number, the current price for the current round, the bidder number of the bidder at each respective bid entry terminal, the quantity which the bidder demands in the current round and any passwords or other security information. In step 308, the bidding information processor receives the information transmitted from the bid entry terminals and sends a confirmation message which may include the current lot number, the current round number, the bidder number of the bidder, confirmation of the bid and passwords or other security information. In step 310, if the auction rules allow, the bid entry terminals may receive corrections to the bids or withdrawals of bids from the bidders and transmit these corrections or withdrawals to the bidding information processor. In addition to the corrections or withdrawals, the current lot number, the current round number, the bidder number and any passwords or security information is also transmitted.

In step 312, the bidding information processor closes the bidding for the current round and processes the bids received from each of the bid entry terminals. This process is similar to that shown in FIGS. 2b and 2c. In step 314, the BIP determines whether any available objects remain. If so, the process goes to step 316 in which the BIP increments the current price information and generates the bidding history and any auction announcements and messages. The process then loops to step 304. If no available objects remain, the process goes to step 318, in which the BETs may erase the demand curve information from memory.

Figure 4:
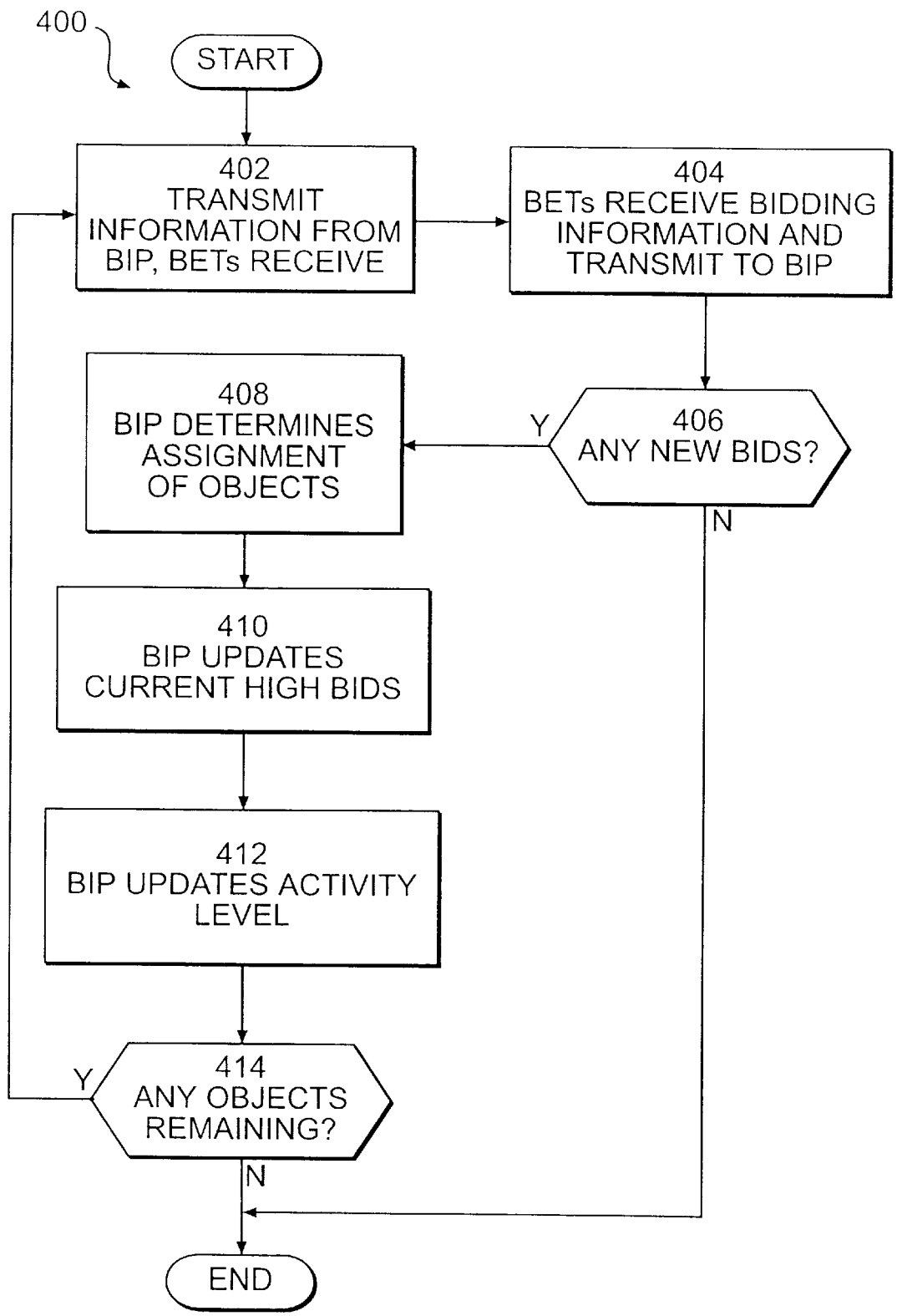
FIG. 4 is a flow diagram of process 400 in accordance with another embodiment of the present invention.

FIG. 4 is a flow diagram of a process 400, in accordance with another embodiment of the present invention. In this embodiment, the auction is conducted differently. Instead of the auctioneer successively announcing prices, the participants name their own bids on individual objects. This embodiment requires an additional auction rule: If a bidder holds the high bid on a plurality of the objects, then competitors are only permitted to bid on a subset of those objects having the highest prices.

Process 400 begins with step 402, in which the BIP transmits a message to each bid entry terminal indicating the current high bid on each object, as well as possibly a minimum new bid and/or a maximum new bid which will be accepted on each object in the current round. Of course, in the first round, the current high bid will not be defined, but the minimum and/or maximum bids may be defined. The BIP also sends individual messages to each bid entry terminal indicating the allowed activity level of the bidder on that BET. The activity level indicates the number of objects on which the bidder at that bid entry terminal may bid. Optionally, the BIP may also provide additional bidding history information, including but not restricted to: the identity of the bidder associated with the high bid on each object, or a secret bidder identification number associated with the high bid on each object; the activity levels of all bidders, in either disaggregated or aggregated form; or the entire history of prior bids.

In step 404, the bidders enter bids into their bid entry terminals, which then transmit the bids to the bidding information processor. Bids may consist of a list of specific objects and a price offered for each object, or simply a quantity of objects and a price offered for that quantity.

In step 406, the BIP then determines whether any new bids were submitted. If none were submitted, then the auction is concluded, and all remaining objects are awarded to the current high bidders at the current high bids. If the auction is not deemed concluded, the process continues with step 408, in which the BIP next determines if any objects are to be assigned to any bidders. It determines this by considering each bidder in turn. The BIP sums the quantities associated with all bidders other than the one being considered. If this sum is less than the number of available objects, the bidder is assigned the units at a price based on the current high bid on these units. The objects so assigned are subtracted from the number of available objects and are removed from the set of objects on which bids will be accepted in subsequent rounds of the auction.

In step 410, the BIP updates its records of the current high bid on all objects which have not yet been assigned. If a bid consists of a list of specific objects and a price offered for each object, then the new high bid for each object is defined to equal the maximum of the previous high bid for that object and all new bids received in the current round for that object (using either a deterministic or a random method of breaking ties). If a bid consists of a quantity of objects and a price offered for that quantity, then the new bids are ranked in decreasing order of price, and all existing high bids are ranked in increasing order of price. New bids are assigned to replace existing high bids in these orders, up to the point where the highest unassigned new bid is less than the lowest remaining existing bid, or until all new bids are exhausted (using either a deterministic or a random method of breaking ties). Optionally, a different order of replacing existing high bids with new bids may be used.

In step 412, the BIP updates its record of the allowable activity level of each bidder. In any round of the auction, the activity level of a bidder is the sum of: the quantity of objects on which the bidder holds the standing high bid at the start of the round; and the quantity of objects on which the bidder places new bids in the round. The auction rules require that bidders' activity levels are monotonically nonincreasing, i.e., the number of objects on which a bidder is allowed to bid in a particular round is less than or equal to the number of objects on which the bidder was allowed to bid in the preceding round.

In step 414, the BIP determines if any objects remain available. If not, the auction is deemed concluded and the process ends. If so, if the auction has not yet been deemed concluded and the process loops to step 402.

Modifications to these embodiments are envisioned. For example, process 300 may be modified to allow each bidder to manually override the quantity generated by the bid entry terminal (subject to satisfying the rules of the auction). Process 300 may also be modified to allow each bidder to revise at any time the portion of the previously entered transaction curve relating to prices which have not yet be accessed.

Process 200 may be modified to allow entry of future transaction curves and contingent transaction curves, while retaining the ability of the bidder to determine his bid at each round.

The embodiments may be modified to allow bidders to input either their marginal values associated with each quantity (i.e., inverse demand curves), or their total values at each quantity, and for the BETs and the BIP to process this information accordingly.

It will be seen by one of skill in the art that other embodiments and other modifications to the described embodiments, which are equivalent to those described, are possible.

What is claimed is:

1. A method for conducting an automated auction in a system including a plurality of bid entry terminals, bid entry terminals operated by bidders, and a bidding information processor, the bidding information processor being communicatively coupled to bid entry terminals, the method comprising:
   a) receiving transaction curve information from participating bidders at a plurality of bid entry terminals;
   b) transmitting a signal representing bidding information from the bidding information processor to a plurality of the bid entry terminals, the current bidding information including at least an indicator of a current price;
   c) accessing the received transaction curve information at the bid entry terminal, extracting a bid corresponding to the current price and transmitting a signal representing the bid to the bidding information processor; and
   d) generating updated bidding information and repeating a)–c), if any objects remain available.

2. The method of claim 1, wherein the generating of updated bidding information comprises receiving, at the bidding information processor, an updated current price.

3. The method of claim 1, further comprising:
   before generating updated bidding information, determining a quantity of objects which will be assigned to each bidder, based on the received bids, at the bidding information processor.

4. The method of claim 3, further comprising determining a price for all objects assigned equal to the current price at the time the last remaining available object is assigned.

5. The method of claim 3, wherein the determining comprises:

a) summing the quantities to be transacted by all bidders to determine a total quantity of objects desired at the current price;

b) if the total quantity of objects to be transacted at the current price is greater than the current quantity of available objects, assigning objects to a bidder based on the bids of the other bidders and decreasing the current quantity of objects available;

c) if the total quantity of objects to be transacted at the current price is not greater than the current quantity of available objects, assigning to each bidder a quantity of objects corresponding to each bidder's respective bid.

6. The method of claim 5, wherein the assigning of objects to a bidder based on the bids of the other bidders comprises:

a) selecting for consideration a bidder not yet considered;

b) summing the quantities to be transacted by all bidders other than the bidder being considered;

c) if the sum of the quantities to be transacted by all bidders other than the bidder being considered is less than the current quantity of available objects, assigning the objects in excess of those to be transacted by all bidders other than the bidder being considered to the bidder being considered and subtracting those objects from the current quantity of available objects;

d) repeating a)–c) for each participating bidder.

7. The method of claim 3, further comprising determining a price for each object assigned equal to the current price at the time the object was assigned.

8. The method of claim 1, wherein the transaction curves include demand curves which are constrained so that a quantity demanded at a price is not larger than a quantity demanded at a lower price.

9. The method of claim 1, wherein the transaction curves include supply curves constrained so that a quantity offered at a price is not larger than a quantity offered at a higher price.

10. The method of claim 1, wherein no information relating to previous bids entered at other bid entry terminals is displayed at a bid entry terminal.

11. The method of claim 1, wherein no transaction curve information not necessary to determine the outcome of the auction is transmitted to the bidding information processor.

12. The method of claim 1, wherein the transaction curve information comprises contingent transaction curves, the bidding information comprises bidding history information and wherein the accessing comprises accessing the contingent transaction curves based on the bidding history information.

13. The method of claim 1, wherein bidders are allowed to modify transaction curve information entered into the bid entry terminals, but which has not yet been accessed.

14. The method of claim 1 wherein the bid is in the form of a transaction curve.

15. A system for conducting an automated auction comprising:

a plurality of bid entry terminals, bid entry terminals operated by bidders;

a bidding information processor, the bidding information processor being communicatively coupled to bid entry terminals and comprising means for generating current bidding information, the current bidding information including at least an indicator of a current price, means, coupled to the generating means, for transmitting a signal representing current bidding information from the bidding information processor to each of the plurality of bid entry terminals, means for receiving bids from the bid entry terminals, means for determining a quantity of objects which will be assigned to each, based on the received bids; and each of the plurality of bid entry terminals comprising:

means for receiving bid input information including transaction curve information from a participating bidder, means for receiving current bidding information from the bidding information processor, and means, coupled to the transaction curve information receiving means and the bidding information receiving means, for accessing the received transaction curve information at the bid entry terminal, extracting a bid corresponding to the current price and transmitting a signal representing the bid to the bidding information processor.

16. The system of claim 15, wherein the determining means comprises means for assigning a price to each object assigned which is equal to the current price at the time the object was assigned.

17. The system of claim 15, wherein the determining means comprises means for assigning a price to each object assigned which is equal to the current price at the time the last remaining available object is assigned.

18. The system of claim 15, wherein the determining means comprises:

a) first summing means for summing the quantities of objects to be transacted by all bidders at the current price;

b) first comparing means, coupled to the first summing means, for comparing the summed quantity of objects to be transacted at the current price with the current quantity of available objects;

c) first assigning means, coupled to the comparing means, for assigning objects to a bidder based on the bids of the other bidders and decreasing the current quantity of objects available, if the summed quantity of objects to be transacted at the current price is greater than the current quantity of available objects; and d) second assigning means, coupled to the comparing means, for assigning to each bidder a quantity of objects corresponding to each bidder's respective bid, if the summed quantity of objects to be transacted at the current price is not greater than the current quantity of available objects.

19. The system of claim 18, wherein the first assigning means comprises:

a) means for selecting for consideration a bidder not yet considered;

b) second summing means, coupled to the selecting means, for summing the quantities to be transacted by all bidders other than the bidder being considered;

c) second comparing means, coupled to the second summing means, for comparing the quantity to be transacted by all bidders other than the bidder being considered with the current quantity of available objects; and d) third assigning means, coupled to the comparing means, for assigning the objects in excess of those to be transacted by all bidders other than the bidder being considered to the bidder being considered and subtracting those objects from the current quantity of available objects, if the quantity to be transacted by all bidders other than the bidder being considered is less than the current quantity of available objects.

20. The system of claim 15, wherein the transaction curves include demand curves which are constrained so that a quantity demanded at a price is not larger than a quantity demanded at a lower price.

21. The system of claim 15, wherein the transaction curves include supply curves constrained so that a quantity offered at a price is not larger than a quantity offered at a higher price.

22. The system of claim 15, wherein a bid entry terminal further comprises means to prevent display of information relating to previous bids entered at other bid entry terminals.

23. The system of claim 15, wherein a bid entry terminal further comprises means to prevent transmission of information not necessary to determine the outcome of the auction to the bidding information processor.

24. The system of claim 15, wherein the transaction curve information comprises contingent transaction curves, the bidding information comprises bidding history information and wherein the accessing comprises accessing the contingent transaction curves based on the bidding history information.

25. The system of claim 15, wherein bidders are allowed to modify transaction curve information entered into the bid entry terminals, but which has not yet been accessed.

* * * * *